A. O. HODGES.
WEIGHING ATTACHMENT FOR REFRIGERATORS.
APPLICATION FILED FEB. 17, 1919.

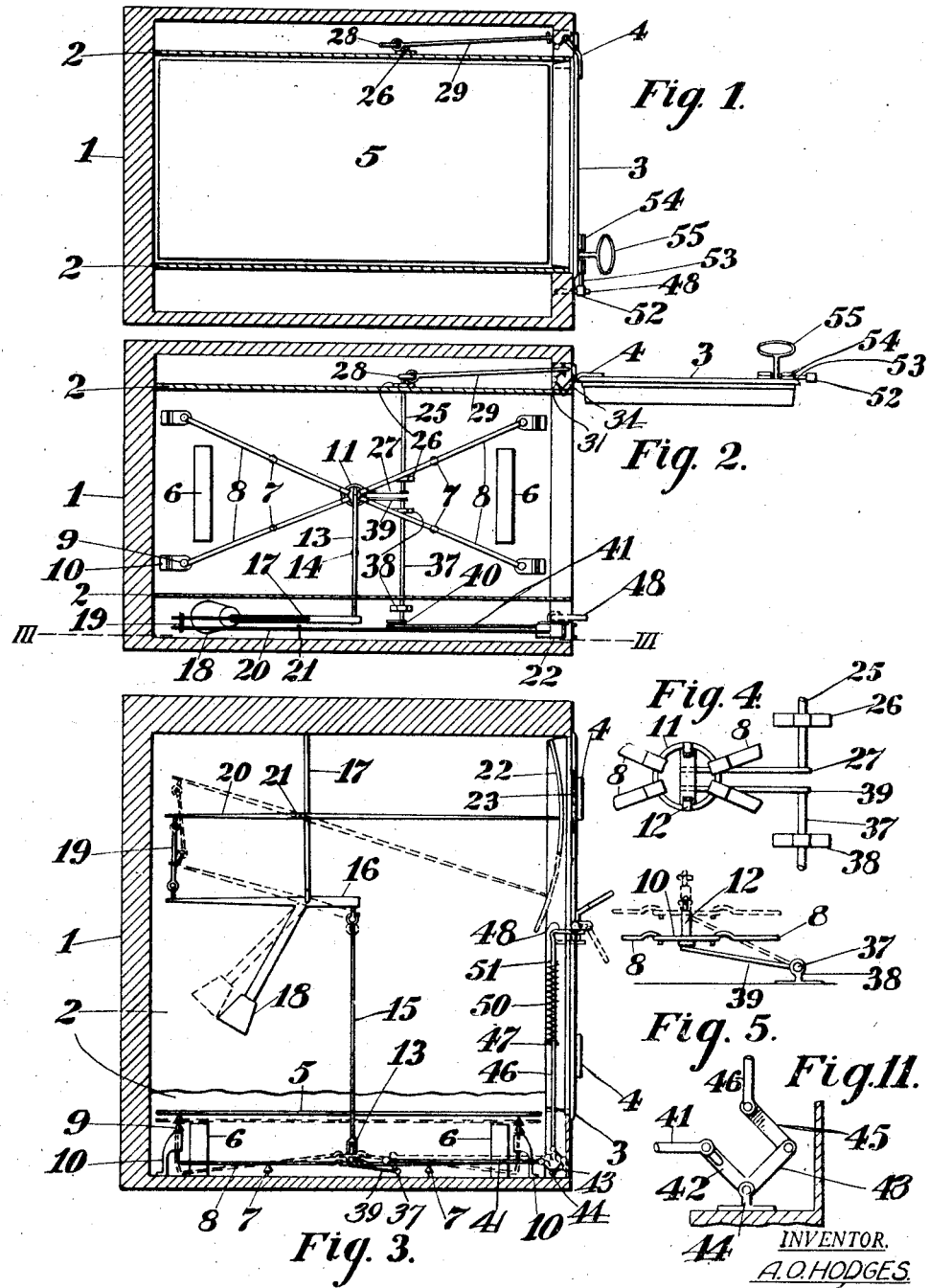

1,358,849.

Patented Nov. 16, 1920.

INVENTOR.
A. O. HODGES.
BY
George J. Thorpe
ATTORNEYS.

UNITED STATES PATENT OFFICE.

ARTHUR O. HODGES, OF INDEPENDENCE, MISSOURI.

WEIGHING ATTACHMENT FOR REFRIGERATORS.

1,358,849.  Specification of Letters Patent.  Patented Nov. 16, 1920.

Application filed February 17, 1919. Serial No. 277,389.

*To all whom it may concern:*

Be it known that I, ARTHUR O. HODGES, a citizen of the United States, residing at Independence, in the county of Jackson and State of Missouri, have invented certain new and useful Improvements in Weighing Attachments for Refrigerators, of which the following is a specification.

This invention relates to ice weighing attachments for refrigerators, and my object is to produce an attachment of this character which is always inoperative for sustaining and weighing ice when the door of the ice compartment is open and also when the door is closed and latched.

A further object is to provide means whereby, when the door is closed, the weighing attachment may be caused to function. A still further object is to provide means for indicating the weight of ice in the compartment by causing the weighing attachment to function.

With these general objects in view, the invention consists in certain novel and useful features of construction and combination of parts as hereinafter described and claimed; and in order that it may be fully understood reference is to be had to the accompanying drawings, in which:

Figure 1, is a horizontal section of a refrigerator equipped with a weighing attachment embodying the invention, certain parts being omitted and the section being above the platform of the attachment.

Fig. 2, is a horizontal section taken just below the top of the refrigerator with the door of the ice compartment open and with the weighing platform omitted.

Fig. 3, is a vertical section taken on the line III—III of Fig. 2.

Figs. 4 and 5, are enlarged fragmentary plan and side views of the central part of the weighing attachment.

Fig. 11, is an enlarged vertical section to disclose more clearly the connections appearing at the lower right hand corner of Fig. 3.

Figure 6:
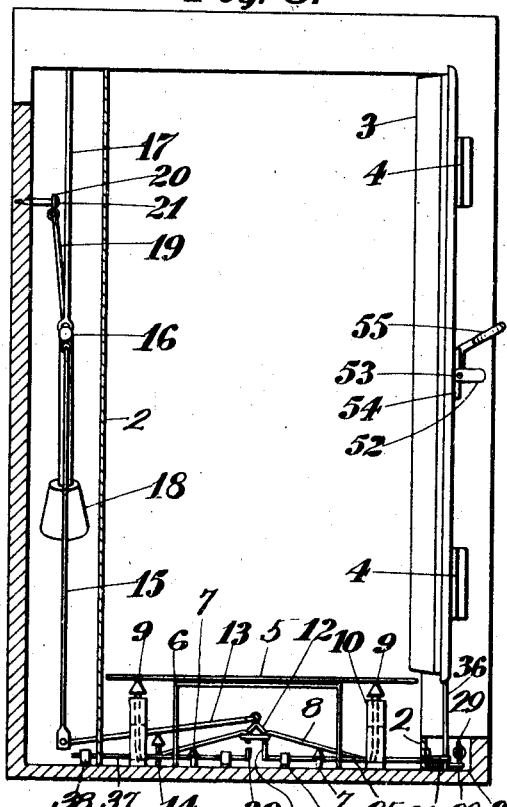
Fig. 6, is a view of the refrigerator chiefly in front elevation with the door in open position and the attachment inoperative.

The drawings illustrate the refrigerating compartment only of a refrigerator 1, the remainder of the refrigerator being of any suitable or preferred type, and said compartment is provided with two vertical partitions 2, which approximately coincide with the hinged and free edges of the door 3, the hinges being indicated at 4.

Located in the compartment between partitions 2 is the platform 5 for the reception of ice, and said platform normally rests upon fixed supporting brackets 6. Between said brackets 6 fulcrums 7 are secured to the bottom of the refrigerator below the platform, for the radially arranged scale beams 8, and the outer ends of said beams extend upward to engage the underside of the platform near the respective corners thereof and constitute supports 9 therefor when the weighing operation occurs, the said supports extending through guide brackets 10 secured to the bottom to the refrigerator.

The inner ends of the scale beams 8 are pivotally connected to a central ring 11 provided with an arched portion 12, to which is pivotally connected the end of a lever 13 mounted on the fulcrum 14 secured to the bottom of the refrigerator, and extending through and having vertical play in one of the partitions 2. The outer end of lever 13 is pivoted to the lower end of an upright link 15 pivoted at its upper end to a weighing beam or lever 16 mounted on the lower end of a hanger 17 secured to the top of the refrigerating compartment, said lever having an adjustable poise or weight 18 for exerting an upward pull upon link 15 and therefore tending to hold the central portion or ring 11 depressed, and the platform elevated, as shown in full lines Fig. 3.

Figure 7:
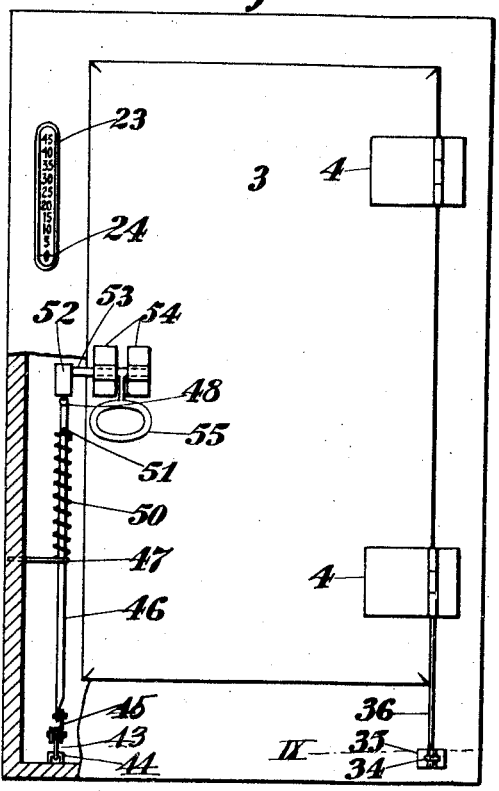
Fig. 7, is a broken front elevation with the door closed, and the door latch mechanism positioned to prevent the weighing attachment from functioning, that is with the door latched.
Figure 8:
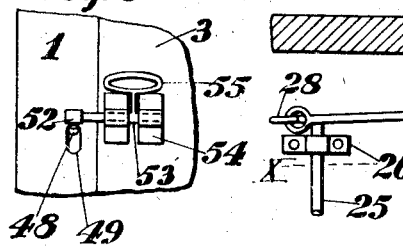
Fig. 8, is a fragmentary front elevation showing the door latch mechanism in position for causing the attachment to function, the door being closed.
Figure 9:
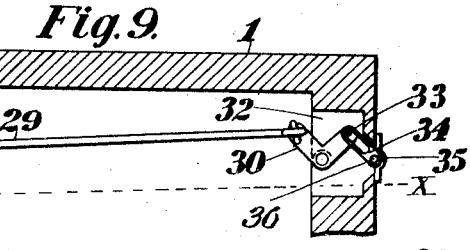
Fig. 9, is an enlarged section taken on the line IX of Fig. 7.
Figure 10:
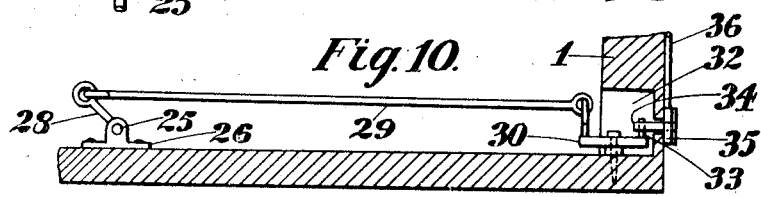
Fig. 10, is a vertical section taken approximately on the line X—X of Fig. 9.

The weighted end of the beam 16 is pivotally connected by a link 19 with an index finger 20 pivoted at 21 and provided at its front end with an arcuate plate 22 fitting and adapted to move upward and downward with said index finger, in a vertical window 23 set in the front wall of the compartment, said window having a transparent face provided near its lower end with a cross mark 24 in the horizontal plane of the indicator finger when the attachment is in operative position but with no load on the platform, the said arcuate plate bearing progressively arranged numbers from zero upward for exposure through said window, the zero mark or number registering with the said indicating or cross mark 24 when the attachment is in the condition last-mentioned, as shown by Fig. 7. When the beam is depressed by ice upon the platform, the arcuate plate moves downward and will dispose a number corresponding to the weight of the ice in register with the said indicating or cross mark, provided the door 3 is closed and the latch is in the position shown by Fig. 8, as will hereinafter appear.

Arranged under the platform and extending transversely of the compartment is a rock shaft 25 journaled in bearings 26 on the floor of the compartment, and said shaft at its inner end has a crank arm 27 underlying the ring 11. At its opposite end said shaft has a crank arm 28 pivotally connected by a link 29 with a horizontal bell crank 30 arranged for convenience in a recess 32 in the front wall of the compartment, and said bell crank has a pin and slot connection at 33 with a crank arm 34 extending through covering plate 35 for the opening in the front wall through which arm 34 extends and forming a bearing for the lower end of an extension 36 of the lower hinge 4 of the door. The extension 36 carries crank arm 34, and the arrangement is such that when the door is opened, said extension 36 turns and thus through the connections described, imparts upward movement to the central portion of the weighing attachment and downward movement to the supporting arms 9 thereof, to permit the platform 5 to rest upon the fixed brackets 6. It will thus be apparent that when the door is open the arm 27 is elevated to effect the lowering of the platform supports 9 so that the load shall be carried by said brackets. When the door is closed the positions of the parts last-mentioned are reversed, that is to say the crank arm 27 below the central portion of the weighing mechanism, is depressed and hence sustains no weight and is inoperative.

A transverse rock shaft 37, shown as alined with rock shaft 25, and journaled in the floor brackets 38, is provided at one end with a crank arm 39 underlying and adapted at times to engage the central portion of the weighing mechanism, and at its outer end with a crank arm 40 pivotally connected by a link 41, with a pin and slot connection 42 to a bell crank 43 fulcrumed on the bracket 44 secured to the floor of the compartment, and said bell crank is pivotally connected by a link 45 to a vertical rod 46 extending through a suitable guide 47. The rod is provided at its upper end with an outwardly-projecting arm 48 extending through a guide slot 49 in the front wall of the compartment adjacent the free edge of door, as shown clearly in Fig. 8. The rod 46 is held yieldingly elevated by an encircling spring 50, which bears at its lower end on the guide 47 and at the upper end against a collar 51 on said rod. The action of this spring, when unrestrained, that is when the door is open or when the door is closed and latched, is to lower the platform on brackets 6, as will hereinafter appear, as the crank arm 39 is performing no function because it is depressed and out of contact with the central portion of the weighing mechanism as shown in Fig. 6. When the door is unlatched as indicated by full lines, Fig. 3, and by Fig. 8, the spring 50 raises rod 46 and depresses crank arm 39 to the position shown in Fig. 6, and thus leaves the platform free to be raised by the weight 18 and indicate through the indicating mechanism described, the quantity of ice on the platform. The parts 40 to 51 inclusive are omitted from Fig. 6, to disclose parts otherwise partly obscured.

The latch mechanism is of a type in common use but that part of it which actually performs the latching function is omitted. As shown, the latch comprises a crank arm 52 overlying the arm 48 of rod 46, and formed on the rock shaft 53 journaled in brackets 54 secured to the outer face of the door 3, the shaft having a handle 55 which in the unlatched position of the door, is elevated (see full lines Figs. 3 and 8) so as to permit the rod 46 to be elevated and thereby effect the depression of the crank arm 39 and leave the weight 18 free to depress the ring 11 and thereby rock beams 8 to raise the supports 9 and the load, and hence indicate the quantity of ice on the platform. When the handle is depressed the arm 52 depresses the rod 46 and through the connections thereof described, raises ring 11 and lowers the said supports 9 to permit the platform to rest directly on the fixed brackets 6.

From the foregoing it will be seen that the opening of the door lowers the platform supports 9 to inoperative position, and that when the door is closed and thereby loses control of the said supports, the latching of the door functions to accomplish the same purpose, and that the load on the platform is carried by the weighing mechanism only when the door is closed and unlatched, and that the quantity of ice can be determined at any time by unlatching but not opening the door, as the unlatching operation results in imposing the weight of the ice on the supports 9, from which it is transferred to the poise lever 16, and hence to the arcuate plate 22.

It will be apparent that any approved type of platform weighing scale or mechanism having vertically adjustable supports for the platform, means whereby the opening of the door or the latching of the same in closed position shall effect the lowering of said supports and the unlatching of the door the release of said supports, may be employed, as the specific construction of the scale mechanism is of minor importance. It is also obvious that various other structural changes may be resorted to without departing from the principle of construction involved or from the spirit and scope of the appended claims.

I claim:

1. The combination with a refrigerator having a hinged door, a platform within the refrigerator, fixed means of support under the platform, a weighing mechanism having movable platform supports adapted when unrestrained to lift the platform off the said fixed means of support, and means actuated by the opening of the door, to depress said movable supports until the platform rests upon the said fixed means of support.

2. The combination with a refrigerator having a hinged door, a platform within the refrigerator, fixed means of support under the platform, a weighing mechanism having movable platform supports adapted when unrestrained to lift the platform off the said fixed means of support, and means actuated by the opening of the door, to depress said movable supports until the platform rests upon the said fixed means of support, and by the closing of the door to leave said movable supports free for action.

3. The combination with a refrigerator having a hinged door, a platform within the refrigerator, fixed means of support under the platform, a weighing mechanism having movable platform supports adapted when unrestrained to lift the platform off the said fixed means of support, means actuated by the opening of the door, to depress said movable supports until the platform rests upon said fixed means of support, and weight-indicating mechanism connected to respond to up and down movements of the platform.

4. The combination with a refrigerator having a hinged door, a platform within the refrigerator, fixed means of support under the platform, a weighing mechanism having movable platform supports adapted when unrestrained to lift the platform off the said fixed means of support, means actuated by the opening of the door, to depress said movable supports until the platform rests upon the said fixed means of support, and by the closing of the door, to leave said movable supports free for action, and weight indicating mechanism connected to respond to up and down movements of the platform.

5. In a refrigerator having a hinged door, a platform, fixed means of support thereunder, radial lever beams having upwardly projecting arms for supporting the platform at times, a connection for the inner ends of said lever beams, a rock lever connected at its inner end for upward and downward movement with the inner ends of said lever beams, a lever carrying a poise and linked to the outer end of said rock lever, an indicating-plate-carrying lever linked to the poise carrying lever, connections actuated by the opening of said hinged door to apply pressure on the scale mechanisms to effect the lowering of the said supports thereof, and to remove such pressure when the door is closed, and a window in the refrigerator having an indicating mark for registration with any point on the face of the said indicating lever-carried plate.

6. The combination with a refrigerator, a platform scale mechanism therein, fixed means for normally supporting the platform of said mechanism, a rod, a movable handle on the refrigerator, to lock the rod in a certain position and for releasing said rod, means to move the rod when released, and connections actuated by said rod when moved by said handle, to lower the platform of the weighing mechanism onto said fixed means of support.

7. The combination with a refrigerator, a platform scale mechanism therein, fixed means for normally supporting the platform of said mechanism, a rod, a movable handle on the refrigerator, to lock the rod in a certain position and for releasing said rod, means to move the rod when released, connections actuated by said rod when moved by said handle, to lower the platform of the weighing mechanism onto said fixed means of support to prevent functioning of the weighing mechanism, and yielding means for returning said rod to normal position to raise the platform from said fixed means of support.

8. The combination with a refrigerator, a platform scale mechanism therein, fixed means for normally supporting the platform of said mechanism, a rod, a movable handle on the refrigerator, to lock said rod in a certain position and for imparting movement to said rod, connections actuated by said rod when moved by said handle, to lower the platform of the weighing mechanism onto said fixed means of support to prevent functioning of the weighing mechanism, yielding means for returning said rod to normal position to effect the raising of the platform from said fixed means of support, and means connected to the weighing mechanism, for indicating on a point exterior of the refrigerator, the weight of any load upon the platform.

9. The combination with a refrigerator having a door, a movable handle carried thereby, a platform in the refrigerator, fixed means of support underlying said platform, yielding means for supporting the platform above the said fixed means of support, a yieldingly elevated rod, connections between said rod and yielding platform-supporting means, whereby upward movement of the rod shall permit the platform to be raised off said fixed means of support by said yielding platform-supporting means, and an arm actuated by said handle for depressing said rod and through the said connections thereof, effect the lowering of said platform onto the said fixed means of support.

10. The combination with a refrigerator having a door, a movable handle carried thereby, a platform in the refrigerator, fixed means of support underlying said platform, yielding means for supporting the platform above the said fixed means of support, a yieldingly elevated rod, connections between said rod and yielding platform-supporting means, whereby upward movement of the rod shall permit the platform to be raised off said fixed means of support by said yielding platform-supporting means, an arm actuated by said handle for depressing said rod and through the said connections thereof, effect the lowering of said platform onto the said fixed means of support, and means for indicating at a point on the exterior of the refrigerator, the weight of any load upon the platform of the weighing mechanism.

In testimony whereof I affix my signature.

ARTHUR O. HODGES.